(12) United States Patent
Siener

(10) Patent No.: US 6,453,591 B1
(45) Date of Patent: Sep. 24, 2002

(54) SYSTEM AND METHOD FOR CREATING A MESSAGE DISPLAY

(75) Inventor: P. Robert Siener, Greene, RI (US)

(73) Assignee: Cooley, Incorporated, Pawtucket, RI (US)

( * ) Notice: Subject to any disclaimer, the term of this patent is extended or adjusted under 35 U.S.C. 154(b) by 13 days.

(21) Appl. No.: 09/620,233

(22) Filed: Jul. 20, 2000

(51) Int. Cl.[7] .............................................. G09F 15/00
(52) U.S. Cl. .............................. 40/624; 40/620; 40/611
(58) Field of Search ........................ 40/624, 594, 620, 40/605, 611; 156/308.2, 308.4, 308.6, 368.8, 309.3, 309.6, 309.9, 244.16, 244.11, 277; 264/165, 168, 172.19, 173.16; 428/99, 100

(56) References Cited

U.S. PATENT DOCUMENTS

| | | | |
|---|---|---|---|
| 3,987,567 A | * 10/1976 | Fritts | 40/611 |
| 4,063,614 A | 12/1977 | Iven | |
| 4,271,566 A | 6/1981 | Perina | |
| 4,635,418 A | 1/1987 | Hobgood | |
| 4,671,004 A | 6/1987 | Berg | |
| 4,711,046 A | 12/1987 | Herrgord | |
| 4,754,582 A | 7/1988 | Cameron | |
| 4,985,950 A | 1/1991 | Gladish | |
| 5,024,015 A | 6/1991 | Quarles, Jr. | |
| 5,255,464 A | 10/1993 | Marecek | |
| 5,256,231 A | * 10/1993 | Gorman et al. | 156/244.16 |
| 5,342,665 A | * 8/1994 | Krawitz | 40/624 X |
| 5,415,451 A | 5/1995 | Stanton | |
| 5,523,129 A | 6/1996 | McGeehan-Hatch | |
| 5,643,397 A | * 7/1997 | Gorman et al. | 156/205 |
| 5,698,275 A | 12/1997 | Pompeo | |
| 5,744,080 A | * 4/1998 | Kennedy et al. | 264/167 |
| 5,900,850 A | * 5/1999 | Bailey et al. | 40/605 X |
| 5,904,793 A | * 5/1999 | Gorman et al. | 156/178 |
| 5,937,555 A | * 8/1999 | Query | 40/610 |
| 6,012,688 A | 1/2000 | LaMotte | |
| 6,018,899 A | 2/2000 | Hanitz | |
| 6,021,593 A | 2/2000 | Hite | |
| 6,056,250 A | 5/2000 | Hillstrom et al. | |
| 6,240,666 B1 | * 6/2001 | Apel et al. | 40/624 |

* cited by examiner

*Primary Examiner*—D. Glenn Dayoan
*Assistant Examiner*—Jason Morrow
(74) *Attorney, Agent, or Firm*—Pillsbury Winthrop LLP

(57) ABSTRACT

A message display is described having a message display surface with a first area. At least one hook fastening element with a second area is affixed to the message display surface. The message display also includes at least one message display panel with a third area. The display panel has a printable surface and an entangled fiber sheet backing. The at least one hook fastening element engages the entangled fiber sheet backing to maintain the at least one message display panel in a fixed relationship to the message display surface. A message display construction system and a method of creating a message display are also described.

28 Claims, 9 Drawing Sheets

SYSTEM AND METHOD FOR CREATING A MESSAGE DISPLAY

FIELD OF THE INVENTION

The present invention is directed to a system and method for creating a message display of the type often affixed to roadside billboards. More specifically, the present invention is directed to the attachment of a single panel (or a number of separate panels) onto a message display surface. The method and system of the present invention greatly facilitate installation, removal, and replacement of the panel (or panels) by the use of hook fastening elements, which engage an entangled fiber sheet backing thereon to secure the single panel (or multiple panels) to the message display surface.

BACKGROUND OF THE INVENTION

Several methods and apparatuses for displaying large-scale (or over-sized) messages, such as those displayed on roadside billboards, are known in the art.

One method is to hire an artist to paint the large-scale message (e.g., an advertisement) onto an appropriate message display surface, such as a billboard. To replace the painted advertisement with another, the advertiser simply paints over the old advertisement. While effective, this technique is used infrequently due to the high cost associated with the labor required. Despite the high cost, however, there are some instances, such as when the advertisement is to remain on the side of a building for a long period of time, where the expense associated with this technique may be justified.

A more common technique for creating an over-sized message display is to have the message or advertisement printed onto several large sheets of paper or plastic film. The sheets are then assembled, like a tiling, onto the display surface (e.g., the billboard). With this technique, the sheets are usually affixed to the advertising surface using a glue or an adhesive that assures the panels will remain attached to the advertising surface under just about any type of weather condition. Since the advertisement is affixed to the advertising surface with glue, however, it is difficult, if not impossible, to remove. Therefore, newer advertisements are usually glued on top of the advertisements previously affixed to the advertising surface.

Alternatively, it is known to stretch the advertisement over the display surface by attaching the advertisement to the edge or the rear of the display surface using hooks connected together with a ratchet cord. The hooks at one end of the ratchet cord are threaded through eyelets in the advertisement while the hooks at the other end of the ratchet cord are attached either to the edge of the display surface or to a suitable location at the rear of the advertising surface. With this technique, removal and replacement of the. advertisement is relatively simple—the hooks need only to be disengaged from the advertisement panel or the advertising surface. However, this fastening technique is limited to advertisements constructed as a single sheet (or assembled as a single sheet from a number of sheets) and cannot be applied to multiple panels or sheets that are to be attached to the same display surface. Moreover, sign or message displays of this type are usually made from a fabric that is woven to give the message display high tensile and tear strength. If signs of this type are not manufactured from a woven fabric with sufficient tensile and tear strength, the hooks simply tear through the edges of the sign upon application of a sufficient amount of force.

Other methods of attaching advertising materials to advertising surfaces are also known. For example, U.S. Pat. No. 5,415,451 ("the '451 patent") describes an apparatus for attaching advertisements to the exterior of a truck, which the patent refers to broadly as a mobile information conveyance system. The attachment apparatus involves attaching a lower retaining channel 11 and an upper retaining channel 12 (with angle brackets 13) to the sides of a standard forty-foot semitrailer. A number of advertising panels 15 are inserted between the retaining channels 11, 12 and are held in place with a safety cable 16 that is held taut between anchors 16B. End channels 14 prevent air (moving at 60+MPH) from dislodging the panels 15 from the retaining channels 11, 12. For the rear rolling door 61 of the semitrailer, the '451 patent describes the use of hook and loop fastening means (e.g., Velcro®) to hold a single panel 65 in place. The loop portion 60B of the hook and loop fasteners is attached to the rear of the vinyl sign 65. Hook fastener strips 60 are attached to the door 61.

U.S. Pat. No. 5,255,464 ("the '464 patent") also describes a way to attach an advertising sign to a truck. In this case, however, the display element 12 is attached to the tailgate of a pickup truck 15. Straps 34 and 36 extend from the top and bottom edges of display element 12 and wrap around the top and bottom of the tailgate where they meet at the rear. Straps 34 and 36 may be provided with hook and loop strip fastening arrangements 94 and 96 to hold the display element 12 onto the tailgate of a pickup truck 15.

U.S. Pat. No. 5,523,129 ("the '129 patent") describes removable scene-scapes bordered by an interchangeable window frame for decorating the walls of a child's room. The background scene-scape 12 is painted with a background scene. The scene-scape 12 is provided with pressure sensitive adhesive for removably affixing the scene-scape 12 to a wall. Hook and loop fasteners 15, 17 may be affixed to the wall around the scene-scape 12 so that a window frame 18 may be removably attached to the wall around the scene-scape 12.

While each of these patents describe the use of hook and loop fasteners for removably attaching elements to a surface, none of them address any of the problems described in connection with the assembly of a large-scale message display from a single panel or from a plurality of separate panels. Moreover, the prior art does not address the construction of a large-scale message display made of flexible sheets with an entangled fiber sheet backing incorporated into the rear surface thereof. Also, none of the prior art describes any technique that simplifies the removal and replacement of a large-scale advertisement from an advertising surface.

SUMMARY OF THE INVENTION

It is, therefore, an object of the present invention to provide a method and system for creating a message display that overcomes the deficiencies in the prior art.

It is further object of the present invention to provide a method and system that facilitates assembly and disassembly of message displays constructed from one or more panels.

It is another object of the present invention to provide a message display having a message display surface with a first area. At least one hook fastening element with a second area is affixed to the message display surface. The message display also includes at least one message display panel with a third area. The display panel has a printable surface and an entangled fiber sheet backing. The at least one hook fastening element engages the entangled fiber sheet backing to maintain the at least one message display panel in a fixed relationship to the message display surface.

A further object of the present invention is to provide a message display panel (or a number of panels) where the area of the entangled fiber sheet backing (or loop fastening element) is an integral part of the entire message display panel (or panels).

The present invention has of one of its objects the provision of a display where the hook fastening elements are disposed in a predetermined pattern on the message display surface. Other objects of the present invention provide the shape and construction of that predetermined pattern.

It is another object of the present invention to provide a hook fastening element that is affixed to the display surface with an adhesive or other attachment method such as staples, rivets, screws, etc.

A further object of the present invention is to provide a message display where the message display panel or panels have a printable surface integrally formed with an entangled fiber sheet backing to provide the loop fastening element that engages at least one hook fastening element affixed to the message display surface. The printable surface may be made from polyvinyl chloride.

It is still another object of the present invention to provide a message display construction system that includes at least one hook fastening element capable of being affixed to a message display surface, and at least one message display panel having a printable surface and an entangled fiber sheet backing. The at least one hook fastening element engages the entangled fiber sheet backing to maintain the at least one message display panel in a fixed relationship to the message display surface.

One further object of the present invention is to provide a method of creating a message display with at least one message display panel with a printable surface and an entangled fiber sheet backing. The method involves affixing at least one hook fastening element to a message display surface. Following that, the at least one message display panel is positioned so that the entangled fiber sheet backing is adjacent to the at least one hook fastening element. Finally, pressure is applied to the at least one message display panel so that the at least one hook fastening element engages the entangled fiber sheet backing to hold the at least one message display panel in a relatively fixed relation to the at least one hook fastening element.

BRIEF DESCRIPTION OF THE DRAWINGS

The various embodiments of the present invention are illustrated throughout the figures, in which.

DETAILED DESCRIPTION OF THE PREFERRED EMBODIMENTS

Throughout the specification, the use of "message display" and similar appellations are intended to refer to the overall display of a message, whether or not it is a commercial (e.g., advertising), political, or personal statement. While it is expected that the present invention will be used primarily for commercial advertising, it should be kept in mind that the present invention may be used for any large-print media, regardless of the reason motivating the use of such media.

Figure 1:
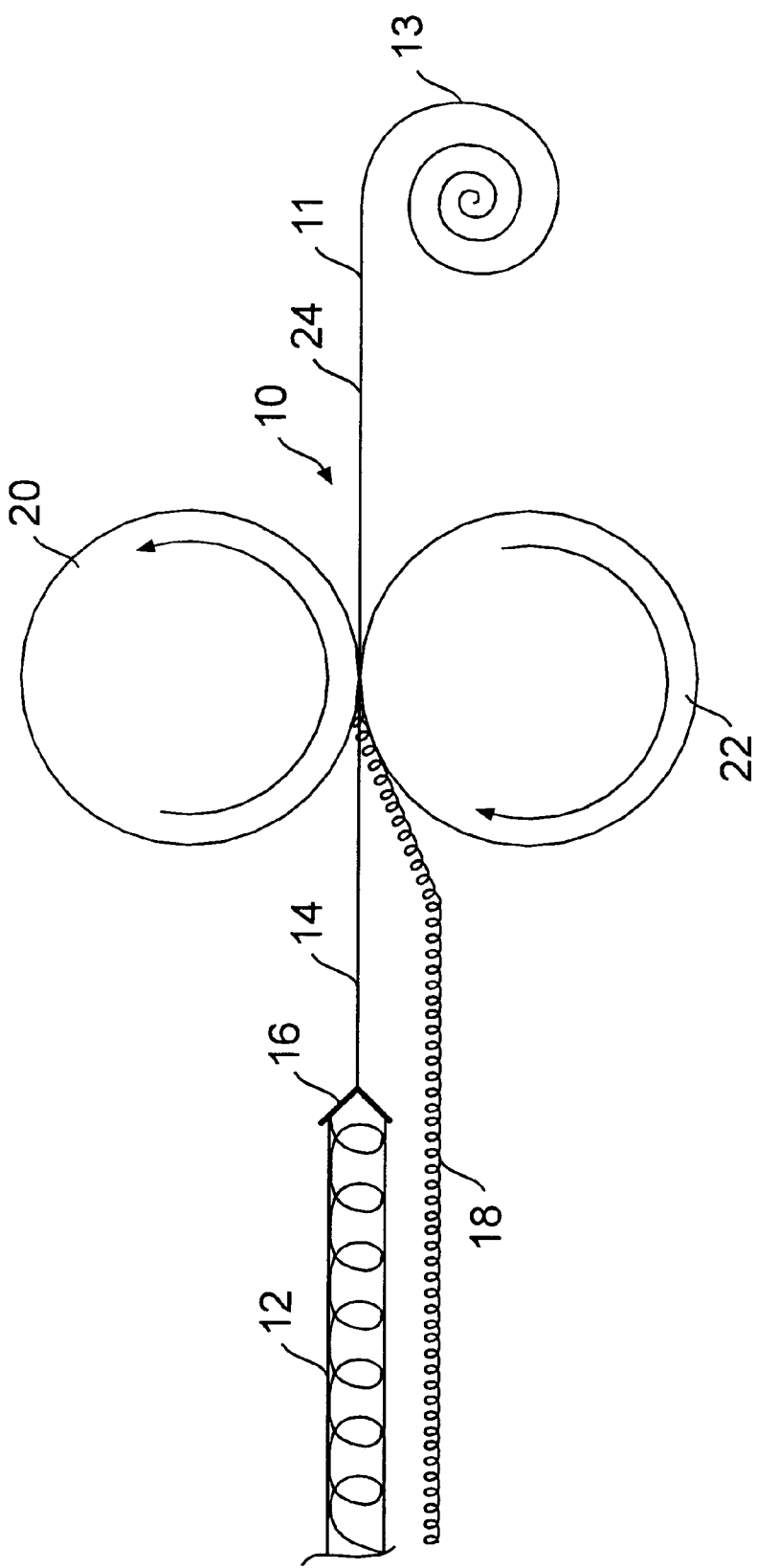
FIG. 1 is a side view schematic illustration of one type of equipment used to manufacture a material with a printable surface on one side and to join it with an entangled fiber sheet backing on the other to create a monolithic product where the entangled fiber sheet backing is imbedded into the printable surface (or film) for maximum attachment value, which is suitable for use with the present invention.
Figure 2:
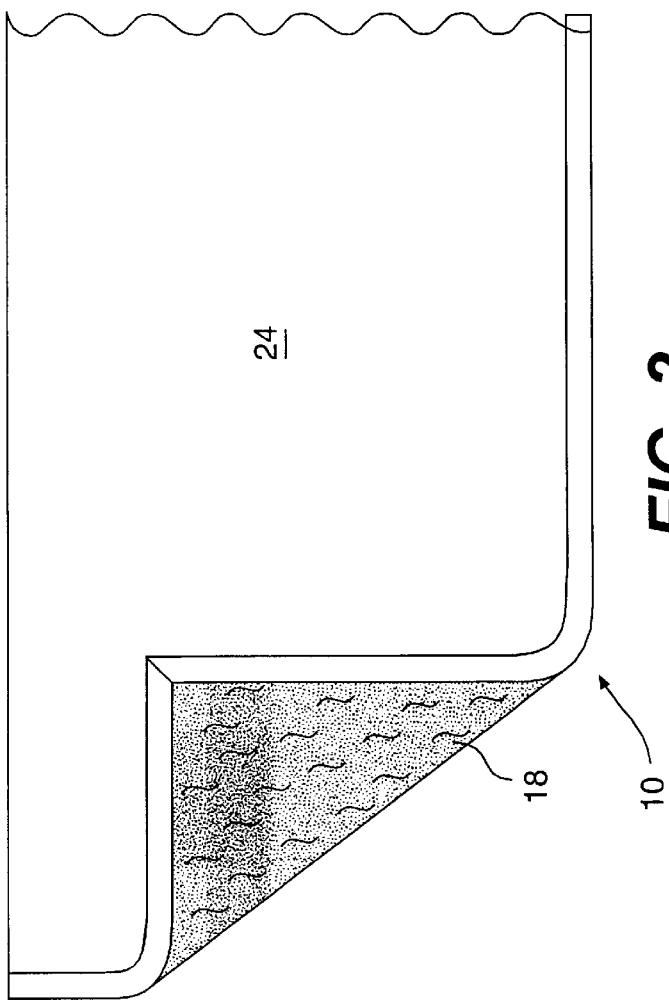
FIG. 2 is top view of a portion of the material illustrated in FIG. 1, showing the printable surface as the top surface and the entangled fiber sheet backing as the bottom surface.
Figure 3:
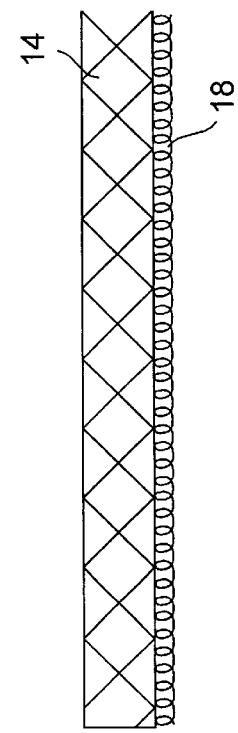
FIG. 3 is a cross-sectional view of the material illustrated in FIGS. 1 and 2, showing the relative thickness of the materials used to construct the material.

FIG. 1 is a side view schematic illustration showing the formation of a material 10 onto which a message may be printed for the assembly of a message display. To fabricate material 10, a heated mixer 12 supplies a thermoplastic material 14, in molten form, to a nozzle 16 that applies molten thermoplastic material 14, in the form of a film, to an entangled fiber sheet backing 18. Thereafter, entangled fiber sheet backing 18 and molten thermoplastic material 14 are carried to a pair of calendering rollers 20, 22 where thermoplastic material 14 and entangled fiber sheet backing 18 are pressed together to form material 10. The direction of rotation of the calendering rollers 20, 22 is indicated by the arrows in FIG. 1.

In the preferred embodiment of the present invention, thermoplastic material 14 that is applied to entangled fiber sheet backing 18 is polyvinyl chloride ("PVC"). While any PVC may be selected for this invention, it is preferred that the PVC be of sufficient quality so that, after calendering, the PVC presents a smooth surface 24 onto which graphic and textual information may be printed easily. PVC of this type is often referred to as "printable PVC."

The preferred printable PVC for the present invention is mixture of a PVC-based resin with a number of additives such as an ultra-violet (UV) light stabilizer, any of a number of anti-oxidants, and other ingredients that enhance ink receptivity. As would be understood by those skilled in the art, the exact formulation of the thermoplastic film 14 may be varied depending upon the particular application and environmental conditions to which the film 14 will be exposed. The present invention is not limited to any particular formulation, and any of a number of formulations may be employed without departing from the scope and spirit of the present invention.

While PVC is preferred for the thermoplastic film 14, those skilled in the art would readily recognize that any suitable thermoplastic material or other film-forming material may be substituted therefor, so long as material 10, after manufacture, presents a printable surface 24.

Entangled fiber sheet backing 18 is basically any group of fibers put together in web form to present a sheet that can have a polymer film applied to one side, and on the reverse side, have an entanglement of fibers that engage hook fastening elements such as hook tape. Preferably, entangled fiber sheet backing 18 is a non-woven material made of polyester. While polyester is preferred, specifically a non-woven polyester, those skilled in the art would readily recognize that any material may be substituted therefor. For example, polypropylene and other fibers may be used without departing from the scope and spirit of the present invention.

What is required of the entangled fiber sheet backing 18 is that it provide a structure that is readily grasped by hook fastening elements, which will be described in greater detail below. In addition, it is preferred that the entangled fiber sheet backing 18 be strong enough to hold firmly to the hook fastening elements. Also, entangled fiber sheet backing 18 preferably should be dimensionally stable so that it resists the tendency to stretch or shrink over the lifetime of its use. Additionally, entangled fiber sheet backing 18 preferably should resist degradation by water, sun, and exposure to other outdoor environmental conditions and stresses.

In the present invention, material 10 preferably is between about 5 and 40 mils (thousandths of an inch) thick. Of this thickness, PVC film 14 is preferably between about 4 and 40 mils thick. It is more preferred that PVC film 14 have a thickness between about 4 and 8 mils. In the most preferred embodiment, PVC film 14 has a thickness of about 4 mils. Entangled fiber sheet backing 18 preferably has a weight per unit area of between about 1 and 8 ounces per square yard ("ounces/sq. yd." or "oz./sq. yd."). In a more preferred embodiment, entangled fiber sheet backing 18 has a weight per unit area of between about 2 and 4 ounces/sq. yd. In the most preferred embodiment, entangled fiber sheet backing 18 has a weight per unit area of about 3.1 ounces/sq. yd.

As FIG. 1 illustrates, in the preferred embodiment, material 10 is made using a continuous process. As a result, the final construction of material 10 is a continuous sheet 11 that may be rolled onto a cylinder drum 13.

It should be noted that the equipment illustrated in FIG. 1 for the manufacture of material 10 is merely exemplary of one such arrangement. It is possible to manufacture a material with a printable surface 24 and an entangled fiber sheet backing 18 by any number of alternative methods or apparatuses. Certain of these methods do not require a thermoplastic material. Nevertheless, they create materials that are equally well suited for the present invention.

To create a message display, material 10 is partitioned into panels. For the example in FIG. 4, four panels, designated as 26, 28, 30, and 32, are shown. While panels 26, 28, 30, 32 may be of any size suitable for a particular advertising application, panels 26, 28, 30, 32 generally are cut to a predetermined size so that they have uniform dimensions. In the preferred embodiment of the present invention, panels 26, 28, 30, 32 have a width 38 of between about 3 and 12 feet and a height 40 of about 10 feet, depending upon the final size for the message as well as the size of the message display surface. As a general rule, the most preferred size for the completely-assembled message panel 34 is 10 feet tall by 25 feet wide, which is a standard billboard size. Also, message panel 34 may be constructed so that it is 17 feet tall by 48 feet wide, which is a larger standard size known in the art.

In the preferred embodiment of the present invention, panels 26, 28, 30, 32 are pre-assembled into unitary message panel 34 by pre-attaching the panels to one another along seams 35, 37, and 39, as illustrated. Panels 26, 28, 30, and 32 are preferably welded together at seams 35, 37, and 39. However, as would be understood by those skilled in the art, seams 35, 37, and 39 may be made by any suitable technique that assures message panel 34 will not split apart during its operative lifetime. Moreover, message display 34 may not include any panels or seams at all but may be constructed from a single sheet of material.

Message 36 may be printed onto message display 34 after panels 26, 28, 30, and 32 are assembled. In the alternative, message 36 may be printed onto each of individual panels 26, 28, 30, 32 before seams 35, 37, 39 are created in the manufacture of message panel 34. When message 36 is pre-printed onto panels 26, 28, 30, 32 before assembly of message panel 34, register marks 41 are provided to align the various parts of message 36 to one another.

The size of the message 36 and the size of the printing equipment control whether message 36 is printed onto message panel 34 after it is assembled or whether message 36 is printed onto individual panels 26, 28, 30, and 32 prior to their assembly into message panel 34. For purposes herein, the message 36 displayed is "ADVERTISING MESSAGE." While only text is displayed herein, those skilled in the art would readily recognize that graphical information may also be provided for message 36.

Figure 5:
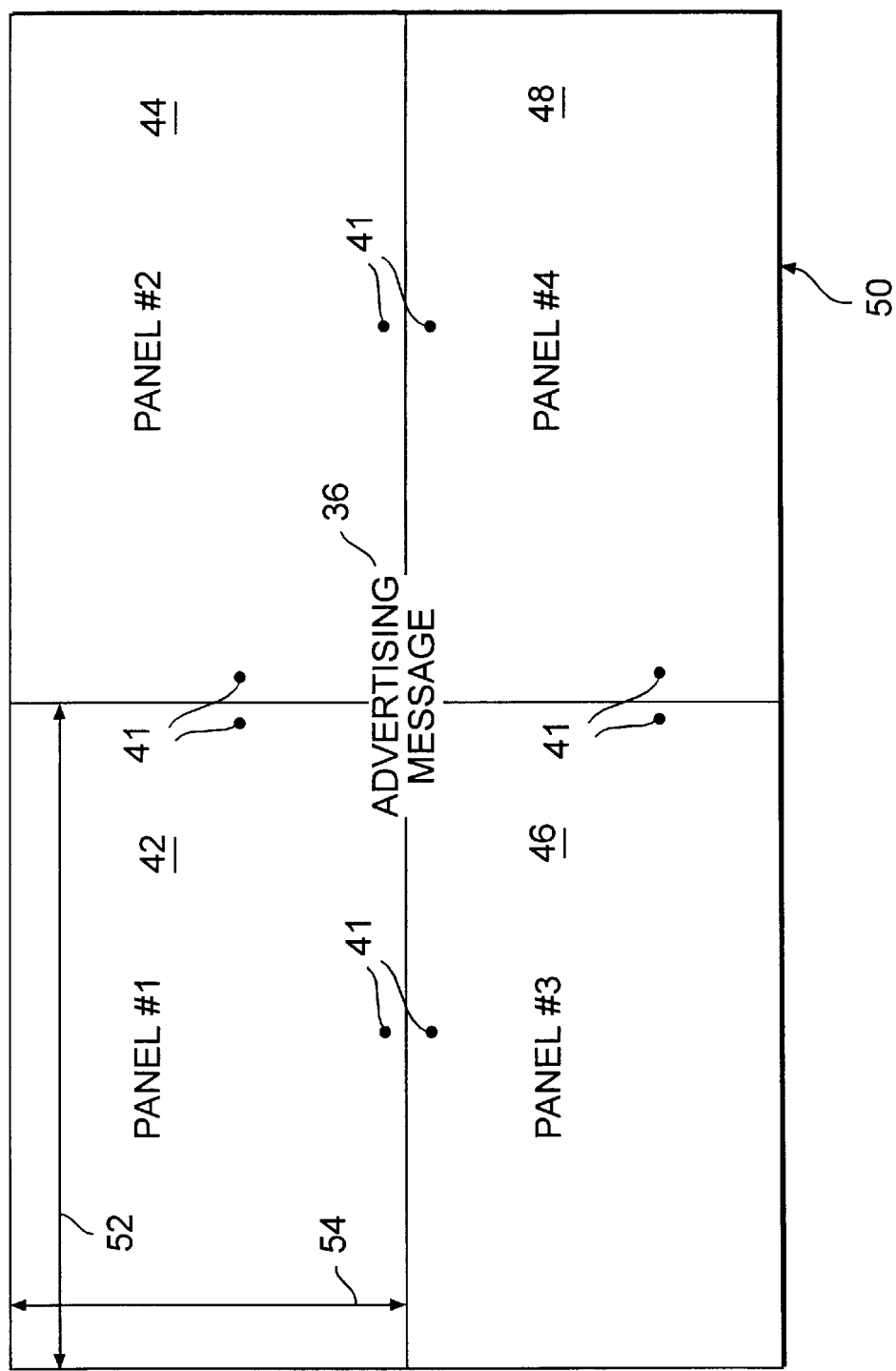
FIG. 5 illustrates a second embodiment of a message display as assembled onto a message display surface.

FIG. 5 illustrates an alternative arrangement of panels 42, 44, 46, and 48 that have been assembled to construct a message panel 50. As with the previous example, while only four panels 42, 44, 46, 48 are illustrated, those skilled in the art would readily recognize that any number of panels may be utilized without departing from the scope and spirit of the present invention. Furthermore, panels 42, 44, 46, 48 may be made with any suitable width 52, height 54, or shape that is required for the particular message panel 50.

Figure 6:
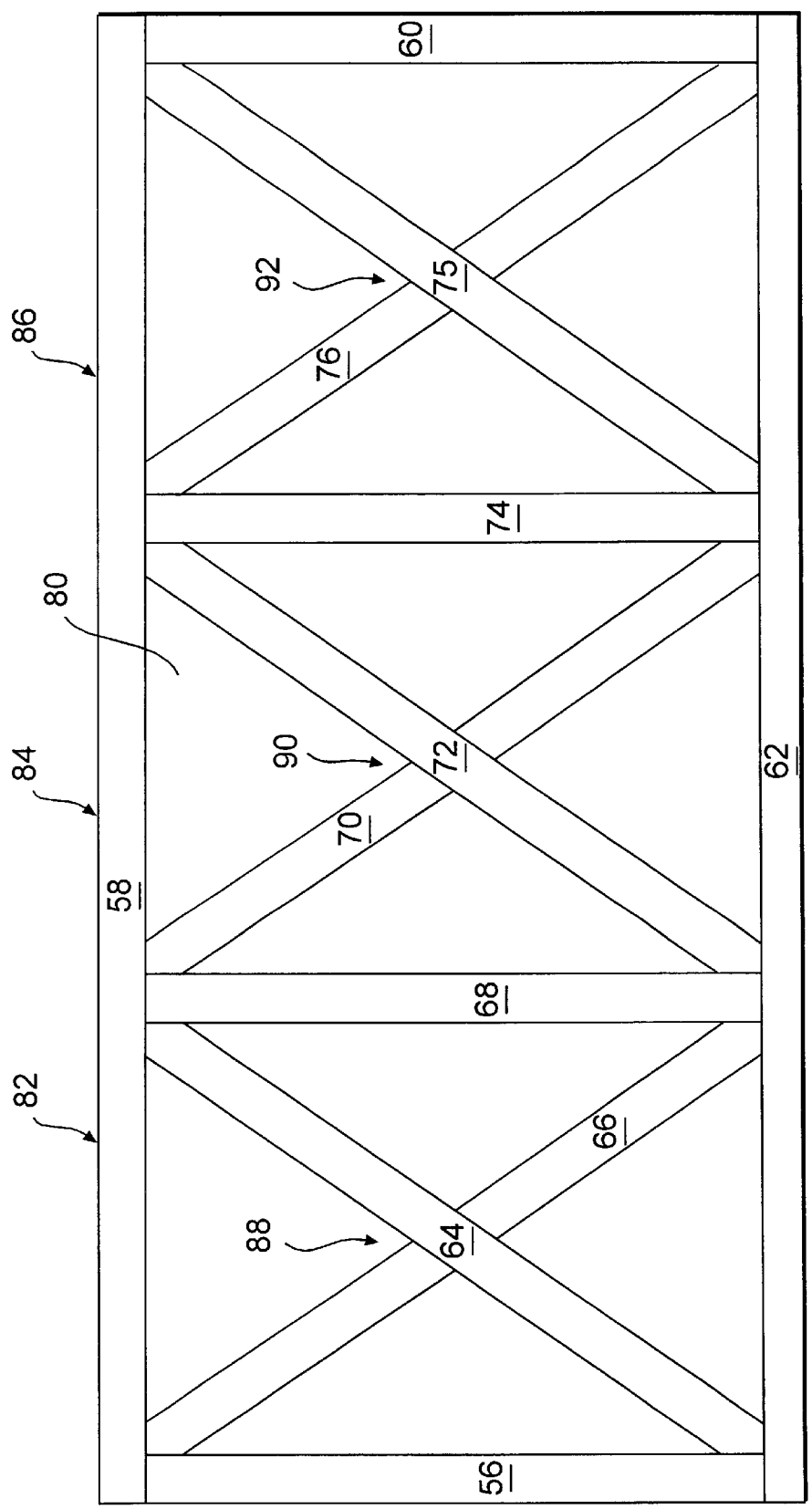
FIG. 6 illustrates the message display surface shown in FIG. 4 with the message display panel removed to expose the hook fastening elements underneath, which are shown in a first preferred pattern.

FIG. 6 illustrates a first embodiment of the pattern for hook fastening elements 60, 62, 64, 66, 68, 70, 72, 74, 76, and 78 that may be affixed to the display surface 80. In this figure, strips of hooks fastening elements 60–78 are arranged in three box-like configurations 82, 84, 86 with X-shaped interior configurations 88, 90, 92. As illustrated, it is not required that hook fastening elements 60-78 occupy the complete display surface 80. As would be understood by those skilled in the art, all that is required is that hook fastening elements 60 78 provide enough surface area to firmly engage entangled fiber sheet backing 18 on message panel 34, 50 so that message panel 34, 50 does not disengage from hook fastening elements 60–78 during its operative lifetime.

When hook fastening elements are applied as strips or as tape, such as with hook fastening elements 60–78, the width of the strips is preferably between about 2 and 4 inches. However, any suitable width of hook fastening strips may be used. For example, hook fastening tape of up to 2 feet in width is commercially available. As would be understood by those skilled in the art, any width of the hook fastening strips may be used without deviating from the scope and spirit of the present invention.

In addition, there are many different varieties of hook fastening elements that are commercially available, all of which are suitable for use with the present invention. For example, hook tape is made with a variety of different hook sizes. The design (or shape) of the hooks also may differ from one variety of hook fastening element to the next. The closeness and direction of the hooks also can vary from one hook fastening element to another.

Figure 7:
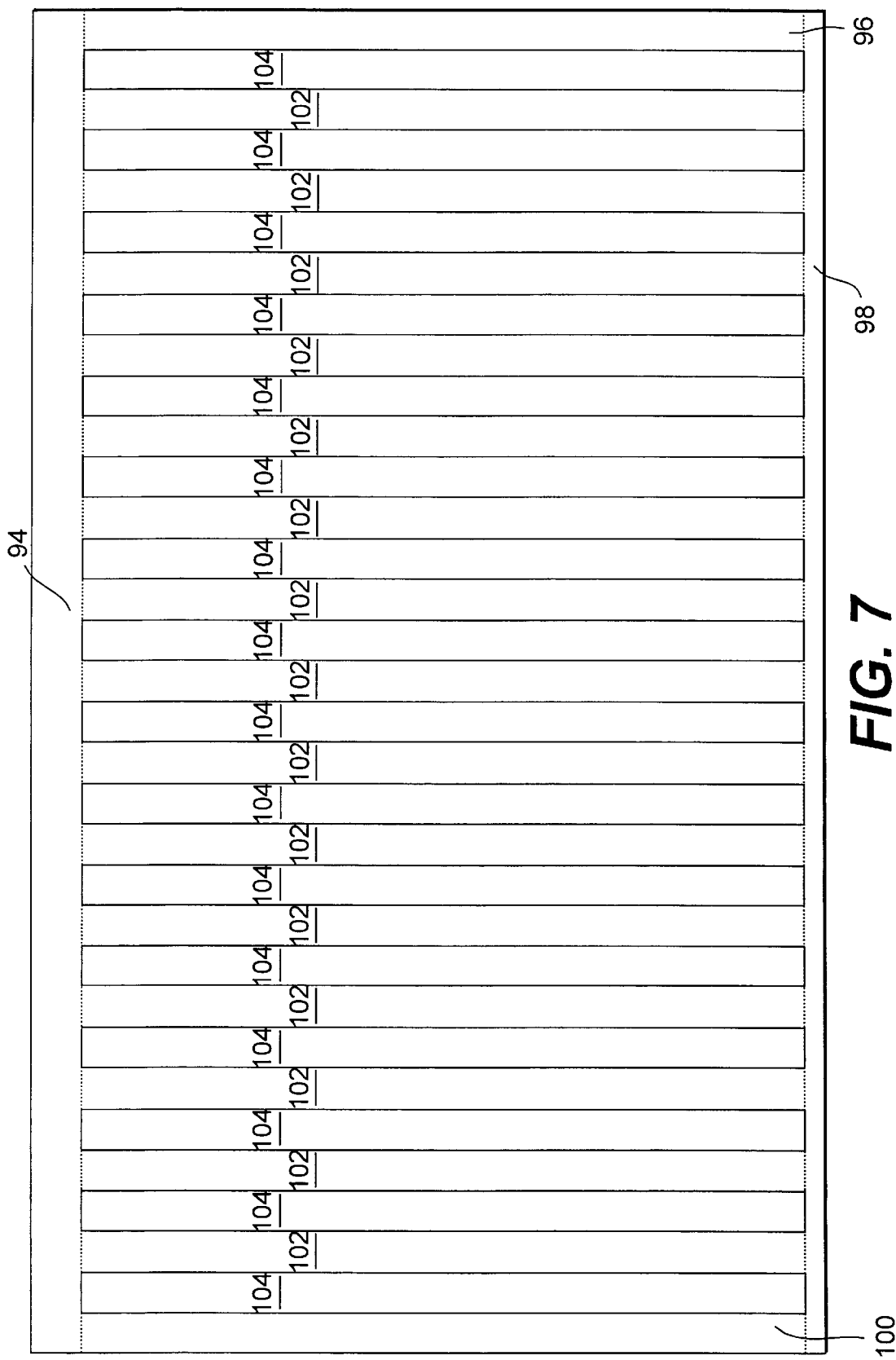
FIG. 7 illustrates a second pattern for the hook fastening elements of the present invention.

FIG. 7 illustrates a second embodiment of the pattern for the hook fastening elements on message display surface 80. In this embodiment, the edges of message display surface 80 are provided with hook fastening edge elements 94, 96, 98, and 100. Vertical hook fastening strips 102 are disposed evenly between left-edge hook fastening strip 100 and right-edge hook fastening strip 96. Interposed between vertical hook fastening strips 102 are regions without hook fastening elements 104.

Figure 8:
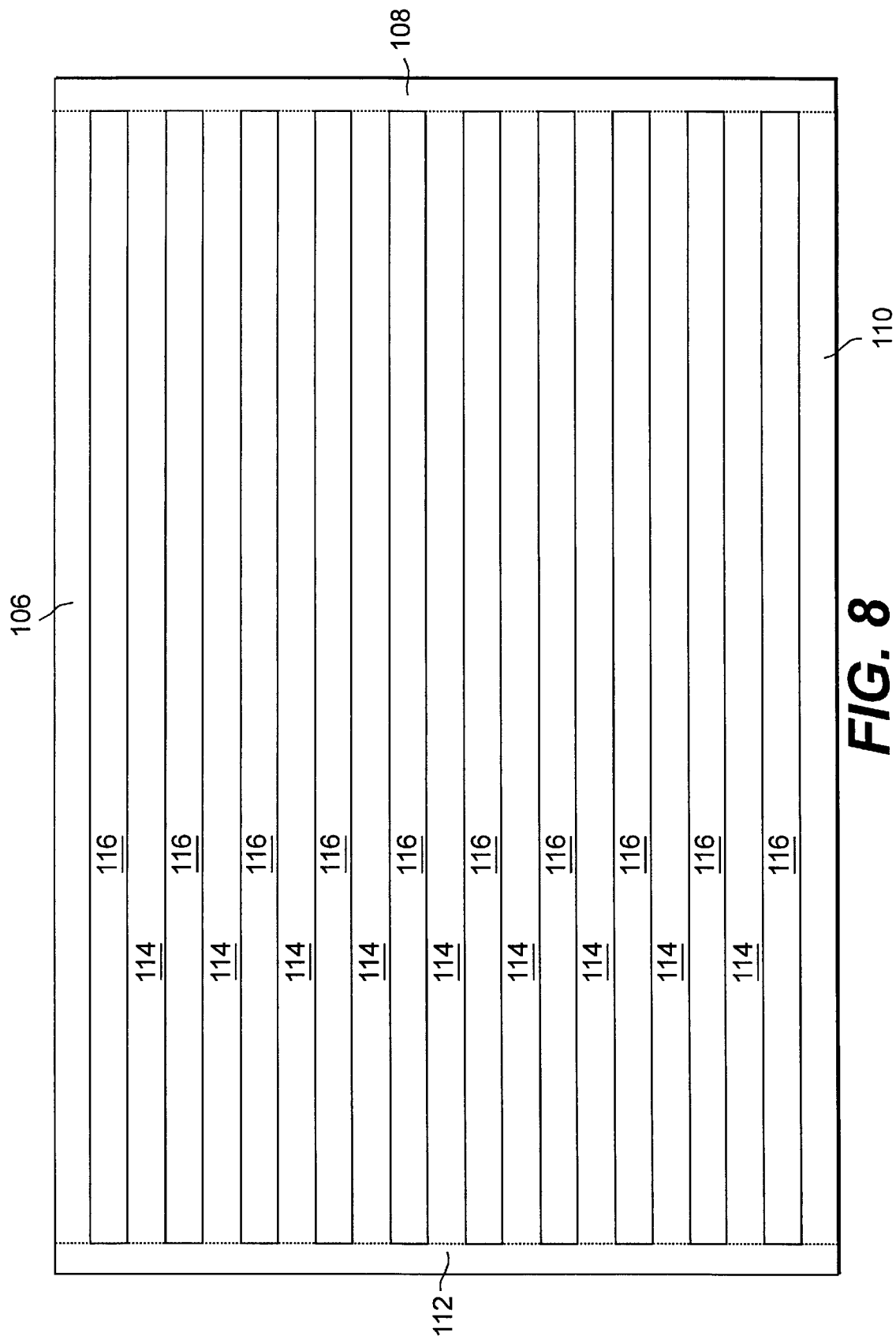
FIG. 8 illustrates a third pattern for the hook fastening elements of the present invention.

FIG. 8 illustrates a third embodiment of the pattern for the hook fastening elements on message display surface 80. In this embodiment, the edges of message display surface 80 are provided with hook fastening edge elements 106, 108, 110, and 112. Horizontal hook fastening strips 114 are disposed evenly between top-edge hook fastening strip 106 and bottom-edge hook fastening strip 110. Interposed between horizontal hook fastening strips 114 are regions without hook fastening elements 116.

Figure 9:
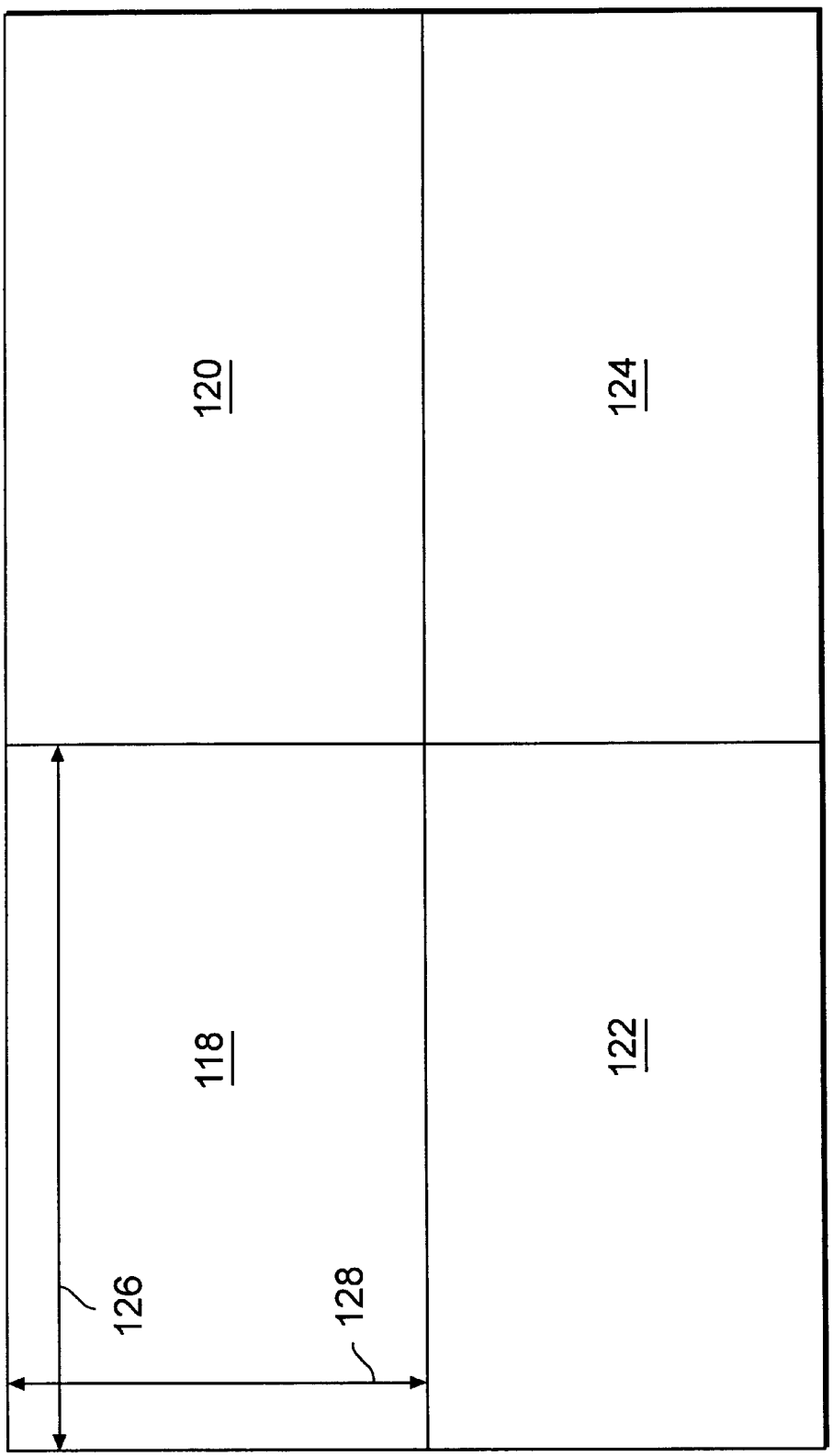
FIG. 9 illustrates a fourth pattern for hook fastening elements, in the form of panels, of the present invention.

As shown in FIG. 9, hook fastening elements in the form of hook fastening panels 118, 120, 122, and 124 may also be affixed to message display surface 80, but, as mentioned above, this is not required. In this fourth embodiment, hook fastening panels 118, 120, 122, and 124 are co-extensive with the entirety of the message display surface 80, and each of the four hook fastening panels 118, 120, 122, and 124 have a width 126 and a height 128 that is suitable for the message display surface 80. In the embodiment illustrated, width 126 and height 128 are equal to width 52 and height 54, but this is not required.

As indicated above, there are infinite number of patterns possible for the hook fastening elements or panels on message display surface 80. The embodiments depicted in FIGS. 6–9 are merely illustrative of four such embodiments.

Figure 4:
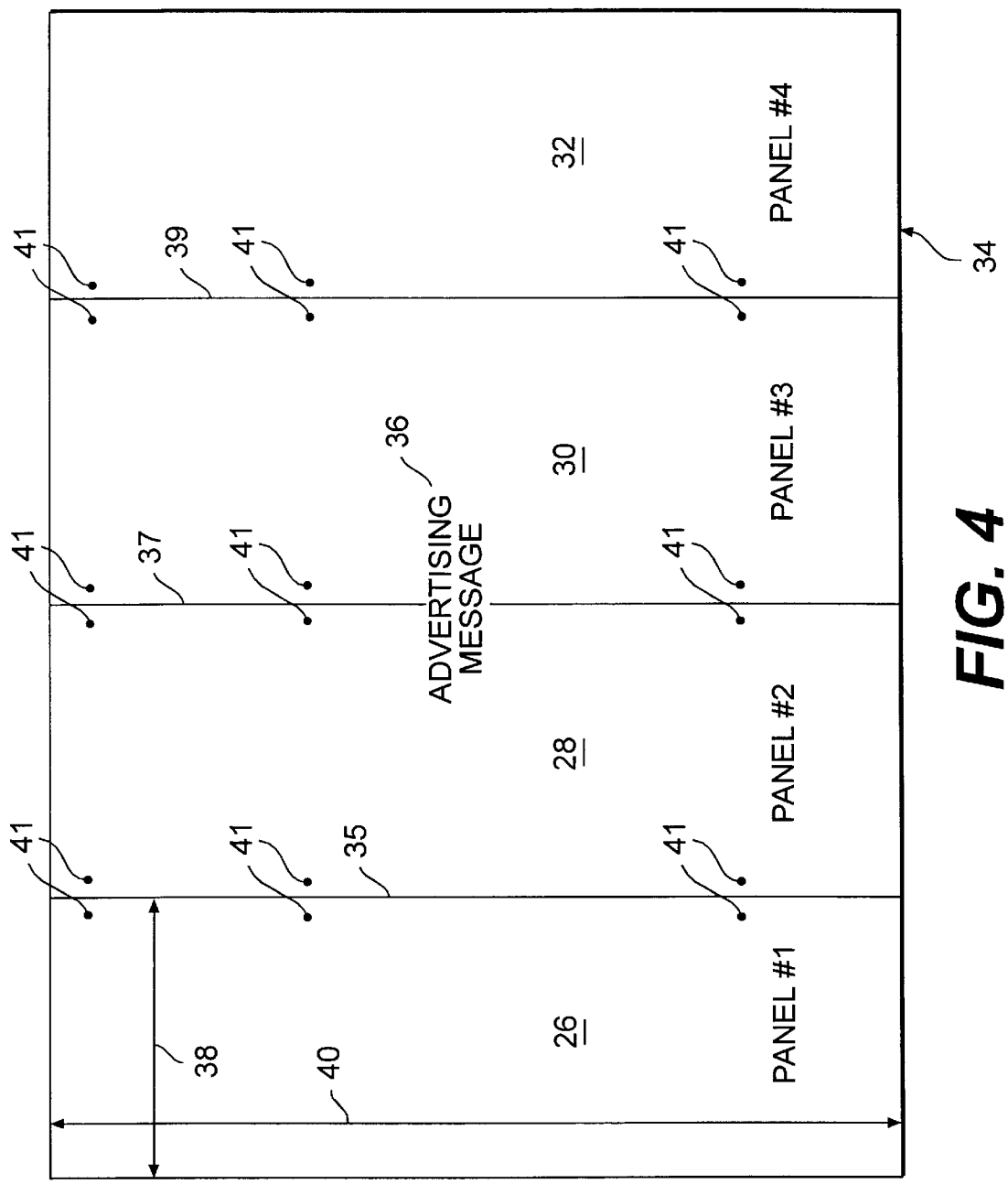
FIG. 4 illustrates a first embodiment of a message display as assembled onto a message display surface.
Figure 10:
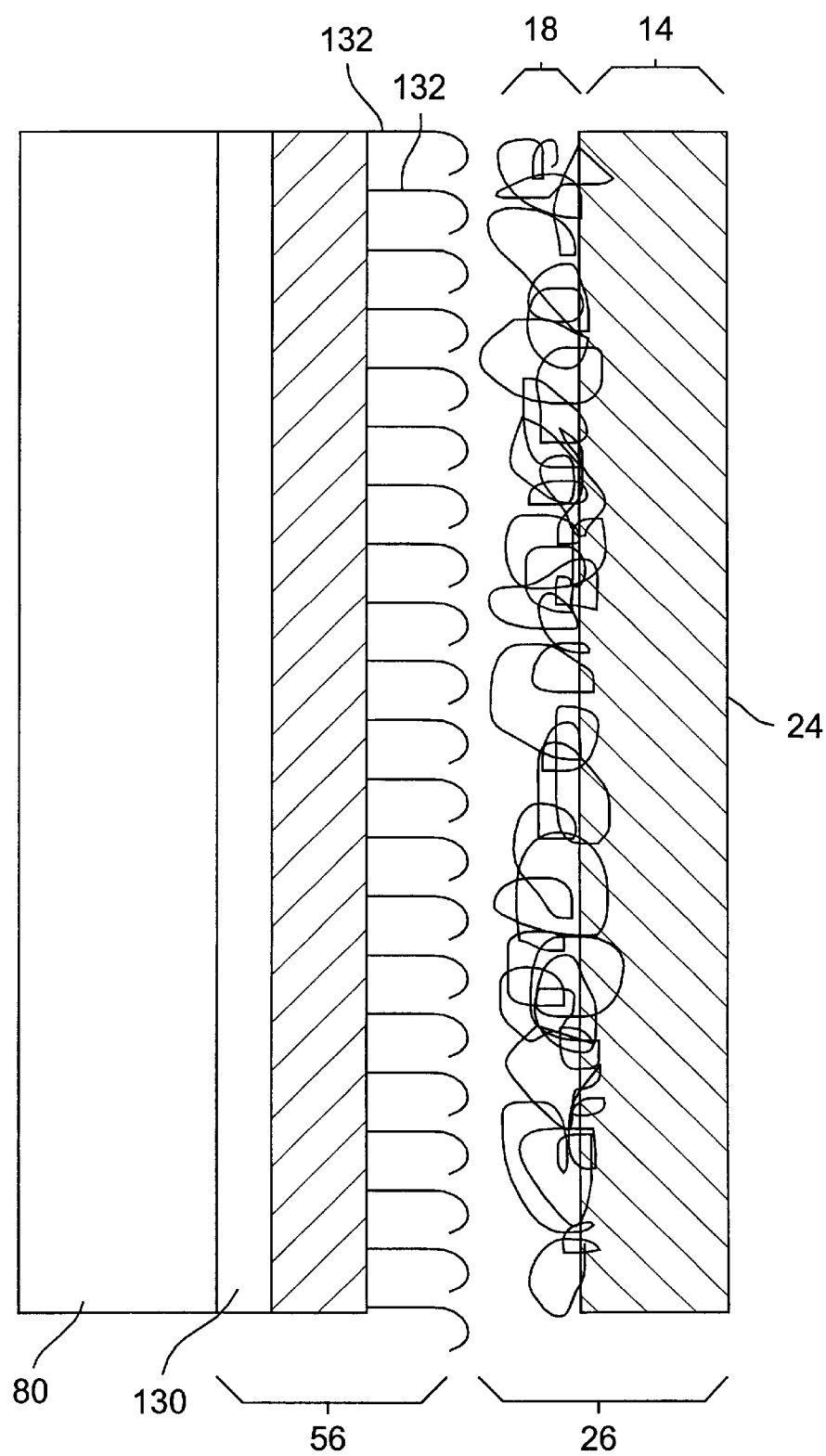
FIG. 10 illustrates a cross-section of a portion of the message display assembly shown in FIG. 4.

FIG. 10 illustrates a partial cross-sectional view of the message panel 34 shown in FIG. 4. Message display surface 80 includes a hook fastening element (e.g., 56) affixed thereon by a suitable adhesive 130. Hook fastening element (e.g., 56) includes a multitude of hook elements 132 extending therefrom to releasably engage entangled fiber sheet backing 18 of panel 34. When panel 34 is pressed against hook fastening elements (e.g., 56), hook elements 132 engage and retain the fibers from entangled fiber sheet backing 18 so that display panel 34 is retained in a fixed relationship to message display surface 80. while the hook fastening elements (e.g., 56) preferably are affixed to message display surface 80 with adhesive 130, staples, nails, rivets, or other forms of positive attachment systems may be used to assure that the hook fastening elements are properly attached to message display surface 80. Moreover, any of adhesive 130, staples, nails, rivets, or other fasteners may be used in combination with one another to act as redundant attachment systems for the hook fastening elements to message display surface 80.

One advantage of the present invention, among others, is that entangled fiber sheet backing 18 is incorporated into the back of message display panel 34. As a result, it is not necessary to attach separate, loop fastening elements to the rear of message display panel 34 so that the hook fastening elements (in whatever pattern they are arranged) may hold message panel 34 in place. This reduces the number of steps required to assemble message display panel 34. In addition, it reduces the overall thickness of message display panel 34. Moreover, the design permits message display panel 34 to be quickly removed from message display surface 80 and readily replaced with a new message 36.

As would be recognized by those skilled in the art, the embodiments described and illustrated herein are merely representative of the present invention and are not intended to limit the scope of the claims appended hereto.

What is claimed is:

1. A message display, comprising:
   a message display surface;
   at least one hook fastening element affixed to the message display surface; and
   at least one unitary message display panel comprising a printable surface and an entangled fiber sheet backing,
   wherein the at least one hook fastening element engages the entangled fiber sheet backing to maintain the at least one message display panel in a fixed relationship to the message display surface.

2. The message display of claim 1, wherein the at least one hook fastening element comprises a plurality of hook fastening elements disposed in a predetermined pattern on the message display surface.

3. The message display of claim 2, wherein the predetermined pattern comprises a plurality of strips arranged in at least one of vertical, horizontal, or diagonal directions.

4. The message display of claim 1, wherein the at least one hook fastening element is affixed to the message display surface by an adhesive.

5. The message display of claim 1, wherein the printable surface is coextensive with the entangled fiber sheet backing.

6. The message display of claim 1, wherein the printable surface comprises polyvinyl chloride.

7. A message display construction system, comprising:
   at least one hook fastening element capable of being affixed to a message display surface; and
   at least one unitary message display panel comprising a printable surface and an entangled fiber sheet backing,
   wherein the at least one hook fastening element engages the entangled fiber sheet backing to maintain the at least one message display panel in a fixed relationship to the message display surface.

8. The message display construction system of claim 7, wherein the at least one hook fastening element comprises a plurality of hook fastening elements capable of being disposed in a predetermined pattern on the message display surface.

9. The message display construction system of claim 8, wherein the predetermined pattern comprises a plurality of strips arranged in at least one of vertical, horizontal, or diagonal directions.

10. The message display construction system of claim 7, wherein the at least one hook fastening element is capable of being affixed to the message display surface by an adhesive.

11. The message display construction system of claim 7, wherein the printable surface is coextensive with the entangled fiber sheet backing.

12. The message display construction system of claim 11, wherein the printable surface comprises polyvinyl chloride.

13. A method of creating a message display with at least one unitary message display panel comprising a printable surface and an entangled fiber sheet backing, the method comprising:
   affixing at least one hook fastening element to a message display surface;
   positioning the at least one message display panel so that the entangled fiber sheet backing is adjacent to the at least one hook fastening element; and
   applying pressure to the at least one message display panel so that the at least one hook fastening element engages the entangled fiber sheet backing to hold the at least one message display panel in a relatively fixed relation to the at least one hook fastening element.

14. The method of claim 13, wherein:
   the at least one hook fastening element comprises a plurality of hook fastening elements, and the plurality of hook fastening elements are affixed to the message display surface in a predetermined pattern.

15. The method of claim 14, wherein the predetermined pattern comprises a plurality of strips arranged in at least one of a vertical, a horizontal, or a diagonal direction.

16. A message display, comprising:

a message display surface;

at least one hook fastening element affixed to the message display surface; and at least one message display panel comprising a printable surface and an entangled fiber sheet backing, wherein the at least one hook fastening element engages the entangled fiber sheet backing to maintain the at least one message display panel in a fixed relationship to the message display surface, and wherein the printable surface is formed with the entangled fiber sheet backing by being pressed together when the printable surface is in molten form.

17. The message display of claim 16, wherein the at least one hook fastening element comprises a plurality of hook fastening elements disposed in a predetermined pattern on the message display surface.

18. The message display of claim 17, wherein the predetermined pattern comprises a plurality of strips arranged in at least one of vertical, horizontal, or diagonal directions.

19. The message display of claim 16, wherein the at least one hook fastening element is affixed to the message display surface by an adhesive.

20. The message display of claim 16, wherein the printable surface comprises polyvinyl chloride.

21. A message display construction system, comprising:

at least one hook fastening element capable of being affixed to a message display surface; and at least one message display panel comprising a printable surface and an entangled fiber sheet backing, wherein the at least one hook fastening element engages the entangled fiber sheet backing to maintain the at least one message display panel in a fixed relationship to the message display surface, and wherein the printable surface is formed with the entangled fiber sheet backing by being pressed together when the printable surface is in molten form.

22. The message display construction system of claim 21, wherein the at least one hook fastening element comprises a plurality of hook fastening elements capable of being disposed in a predetermined pattern on the message display surface.

23. The message display construction system of claim 22, wherein the predetermined pattern comprises a plurality of strips arranged in at least one of vertical, horizontal, or diagonal directions.

24. The message display construction system of claim 21, wherein the at least one hook fastening element is capable of being affixed to the message display surface by an adhesive.

25. The message display construction system of claim 21, wherein the printable surface comprises polyvinyl chloride.

26. A method of creating a message display with at least one message display panel comprising a printable surface and an entangled fiber sheet backing, the printable surface having been formed with the entangled fiber sheet backing by being pressed together when the printable surface was in molten form, the method comprising:

affixing at least one hook fastening element to a message display surface;

positioning the at least one message display panel so that the entangled fiber sheet backing is adjacent to the at least one hook fastening element; and applying pressure to the at least one message display panel so that the at least one hook fastening element engages the entangled fiber sheet backing to hold the at least one message display panel in a relatively fixed relation to the at least one hook fastening element.

27. The method of claim 26, wherein:

the at least one hook fastening element comprises a plurality of hook fastening elements, and the plurality of hook fastening elements are affixed to the message display surface in a predetermined pattern.

28. The method of claim 27, wherein the predetermined pattern comprises a plurality of vertical strips arranged in at least one of a vertical, a horizontal, or a diagonal direction.

* * * * *